United States Patent
Bouchard

(10) Patent No.: US 8,188,849 B2
(45) Date of Patent: May 29, 2012

(54) METHOD AND DEVICE FOR DISPLAYING, IN A MOTOR VEHICLE, THE VALUE OF A PARAMETER

(75) Inventor: Christian Bouchard, Rueil Malmaison (FR)

(73) Assignee: Continental Automotive France, Toulouse (FR)

( * ) Notice: Subject to any disclaimer, the term of this patent is extended or adjusted under 35 U.S.C. 154(b) by 515 days.

(21) Appl. No.: 12/503,995

(22) Filed: Jul. 16, 2009

(65) Prior Publication Data

US 2010/0019893 A1 Jan. 28, 2010

(30) Foreign Application Priority Data

Jul. 25, 2008 (FR) ..................................... 08 04241

(51) Int. Cl.
*B60Q 1/00* (2006.01)
*G08B 5/00* (2006.01)
*G08B 5/22* (2006.01)

(52) U.S. Cl. .................. 340/449; 340/691.1; 340/815.4; 340/815.45; 340/438

(58) Field of Classification Search .................. 340/449, 340/438, 458, 459, 501, 517, 524, 525, 584, 340/588, 691.1, 691.6, 815.4, 815.45; 701/36
See application file for complete search history.

(56) References Cited

U.S. PATENT DOCUMENTS

| 7,501,939 B1* | 3/2009 | Belikov et al. ................ 340/438 |
| 2005/0133347 A1 | 6/2005 | Hein |
| 2005/0212669 A1* | 9/2005 | Ono et al. ..................... 340/461 |
| 2007/0024456 A1* | 2/2007 | Currie ........................... 340/584 |

FOREIGN PATENT DOCUMENTS

WO 03106210 12/2003

OTHER PUBLICATIONS

French search report dated Feb. 18, 2009 in corresponding FR 0804241.

* cited by examiner

*Primary Examiner* — Toan N Pham
(74) *Attorney, Agent, or Firm* — Young & Thompson

(57) ABSTRACT

To display a temperature value in a passenger compartment (5), it is proposed to use a luminous pointer that is moved along a row of modules (7a, 7b . . . ) that are on or off. Values (9a, 9b . . . ) of this temperature are also marked on the panel (3), along this row. Depending on the temperature to be displayed, the pointer will be moved with a single module on for a first type of temperature values and two adjacent luminous modules on for a second type of temperature values that are intermediate between two successive values of the first type.

7 Claims, 1 Drawing Sheet

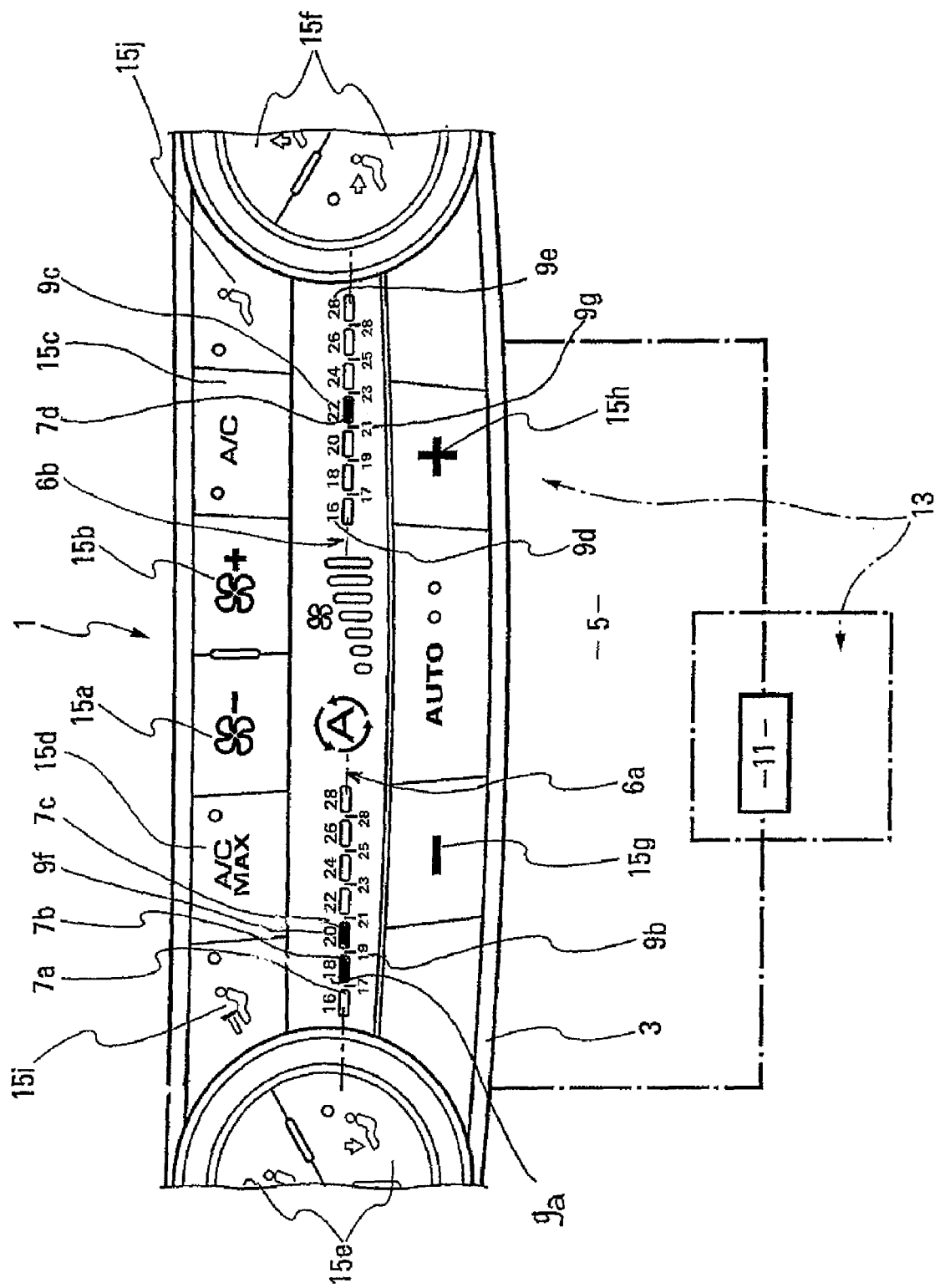

METHOD AND DEVICE FOR DISPLAYING, IN A MOTOR VEHICLE, THE VALUE OF A PARAMETER

The invention relates to a device for displaying on a panel of a motor vehicle an indication of a useful parameter. This display is given more particularly through:
- at least one row of luminous modules that can each change between an on state and an off state,
- and values of this parameter marked on the panel along said row or rows.

The invention relates in particular to the display of an indication of a setting temperature of a heating and/or air conditioning system in the passenger compartment of a motor vehicle.

It has already been proposed that, in particular, the temperature of a motor vehicle heating or air conditioning control be displayed on a segmented or dot matrix liquid crystal display (LCD) screen. These are, however, costly solutions.

One aim targeted by the invention relates to an inexpensive display of an indication of the selected parameter.

Another aim is to produce this display fairly accurately.

Another aim is to limit the electrical consumption of the "luminous modules" normally used for the display, such as the light-emitting diodes (LED).

Yet another aim targeted is to satisfy the requirements for an effective display in a restricted space.

Conventionally, the known devices comprise control devices for placing at least some of these luminous modules either in the on state or in the off state, depending on the indication of the parameter to be displayed.

However, these devices do not meet all or some of the aims expressed hereinabove and targeted by the invention.

The solution proposed here to meet all or some of these aims consists in implementing control means designed to switch on a single module for a first type of values of the selected parameter and two consecutive luminous modules for a second type of values of said parameter corresponding to intermediate values between two successive parameter values of the first type of values.

Thus, there is a considerable difference compared to the conventional solutions where it can be noted that the luminous modules available below the value to be displayed are typically all on, when this value is displayed, with a consequential increased consumption of electrical energy.

In addition to such a device, the invention relates to a method for displaying, on the instrument panel of a vehicle, a temperature indication by using a luminous pointer which moves along a row of luminous modules that can individually change between an on state and an off state with, along this row, temperature values marked on the panel. The method according to the invention is characterized in that, depending on the temperature indication to be displayed, said pointer is made to move along the row of luminous modules, with a single module on for a first type of temperature values and two adjacent luminous modules on for a second type of temperature values.

Thus, according to the invention, there are a maximum of two luminous modules on, and not a plurality, for the display of a parameter value.

The present invention also targets a vehicle equipped with a device according to the invention.

In the interests of clarity in the present description, the example of the display of a temperature value or temperature values as the parameter to be displayed, has been selected, although sound level, tire pressure or other values could replace the temperature values.

Other objects, benefits and features of the present invention will also emerge from the following description, given with reference to a single FIGURE which illustrates a non-limiting exemplary embodiment of temperature display on a part of an instrument panel of a motor vehicle.

In the FIGURE, a device 1 can be seen for displaying a temperature indication on a temperature scale indicated, on a panel 3 situated in the passenger compartment 5 of a motor vehicle, by a row, such as 6a, of luminous modules, such as 7a, 7b . . . , each of which can change between an on state and an off state, and by temperature values 9a, 9b . . . marked on the panel along said row 6a.

Control means 11 are used to place at least some of said luminous modules either in the on state or in the off state, depending on the temperature indication to be displayed.

These control means 11 belong to an onboard electronic system, typically associated with a heating or air conditioning device for the passenger compartment 5, generally identified as 13. As is known, such a heating or air conditioning device blows air at an appropriate temperature into the passenger compartment, through blowing orifices which can pass through the panel 3 and/or the instrument panel of the vehicle.

The panel 3 can moreover be an instrument panel.

Several rows of luminous modules—in this case two; 6a, 6b—are provided, in this case on the same panel 3. These are two rows for displaying a temperature setting that is differentiated between the left (driver's side) and the right (front passenger side) of the vehicle. These two rows are driven by the control means 11.

On the panel 3, the presence of buttons 15a, 15b . . . —in this case push buttons—will be noted, for choosing the desired setting for the heating or the air conditioning, in particular:
- air blowing power (15a, 15b),
- switching the air conditioning on and off (15c),
- forced air conditioning (15d),
- orientation of the blowing to all or some of the blowing outlets (15e, 15f),
- increasing or reducing the desired temperature in the passenger compartment (15g, 15h),
- left (15i) or right (15j) side setting
. . .

In the FIGURE, it can also be seen that the control means 11 are designed to switch on a single luminous module, such as 7d on the right (row 6b), for a first type of temperature values, and two consecutive luminous modules, such as 7b, 7c on the left (row 6a), for a second type of temperature values corresponding to intermediate values between two successive temperature values of the first type of temperature values.

Thus, in FIG. 1, the only module that is on 7d on the row on the right, in this case 6b, corresponds to a value, in this case 9c, out of several even temperature values, such as 9d, 9e. In the example, the desired temperature is 22° C.

The two consecutive luminous modules, 7b, 7c, lit on the left hand row 6a of the panel 3, on the contrary, correspond to an odd temperature value, namely 19° C. in the example. This is indicated by the two successive modules 7b, 7c that are on, in conjunction with the two consecutive temperature values, in this case 9a and 9f, respectively marked 18° C. and 20° C.

It will also be noted that, on the two rows 6a, 6b, odd values are marked, such as 9b, 9g.

Thus, switching on only the successive display modules of two consecutive temperature values marked on the panel indicates that the desired temperature value is intermediate between the values of the two modules that are on: 19° C. is intermediate between 18° C. and 20° C. A single module being on indicates, on the contrary, that the desired value corresponds to the temperature marked in conjunction with this single module: 22° C., in the example.

This could have been different, for example with marked values corresponding to odd temperature values; two successive alternate modules would indicate an intermediate even value, a single module on would indicate an exact odd value.

Whatever the case, indicating even and odd values in this way meets the targeted aims, in a relevant manner for this application of setting an air temperature in the passenger compartment of a vehicle, at low cost.

Favorably, the luminous modules 7a, 7b . . . are light-emitting diodes (LED).

According to the illustration, it would be understood that the control means 11, in order to act, are connected with (or include) the selection/setting members 15a, 15b . . . . They are also connected with (or include) the abovementioned luminous modules and the conventional functional means for implementing the control: air blowing motor(s), blown airstream regulating and/or orienting flap(s), fan(s), etc.

On the basis of the foregoing, it would therefore be understood that, to display on a panel situated in the passenger compartment 5 of a vehicle, an indication, in particular of temperature, it is useful to use a luminous pointer that moves along a row of luminous electrical modules such as 7a, 7b . . . that can each change between an on state and an off state with, along this row, values, such as 9a, 9b . . . of this temperature marked on the panel.

Thus, according to the indication of the temperature to be displayed, the pointer (in this case the diode(s) that is (are) on) will be moved along the row of the luminous modules, with a single module on for the first stipulated type of temperature values and only two adjacent luminous modules on for the second selected type of values.

The temperature of the passenger compartment of a motor vehicle being a parameter that is typically considered as to be displayed on the instrument panel, but the space/investment available for so doing being limited, with in addition a display that must not disrupt the attention of the driver, preference is given to switching on two successive luminous modules for a temperature value of the second type marked on the panel 3 which is intermediate between two successive temperature values of the first type.

The interpretation of the reading is then simple, quick and ergonomic. Furthermore, the quantity of luminous modules that are on (and therefore powered) is restricted to a maximum of two (per display line). The electrical consumption of the luminous members is thus reduced, while offering an effective display.

The invention claimed is:

1. A device for displaying a parameter value indication on a scale of values (9a, 9b . . . ) indicated, on a panel (3) located on a vehicle:
by at least one row (6a, 6b) of luminous modules (7a, 7b . . . ) that can individually change between an or state and an off state,
by values (9a, 9b . . . ) of this parameter marked on the panel (3), along said row (6a, 6b),
and by control means (ii) designed to place in the on or off state at least some of said luminous modules (7a, 7b . . . ), according to the value indication of the parameter to be displayed,
characterized in that said control means (ii) are designed to switch on a single luminous module (7a, 7b . . . ) for a first type of values (9a, 9b . . . ) of said parameter and two consecutive luminous modules (7a, 7b . . . ) for a second type of values (9a, 9b . . . ) of said parameter corresponding to intermediate values between two successive parameter values of the first type of parameter values.

2. The display device (1) as claimed in claim 1, characterized in that the luminous modules (7a, 7b . . . ) are light-emitting diodes.

3. The device (1) as claimed in claim 2, characterized in that said first type of values (9a, 9b . . . ) of said parameter corresponds to even temperature values marked on the panel (3), in the passenger compartment (5) of the vehicle, and the second type of values (9a, 9b . . . ) of the parameter corresponds to odd temperature values.

4. The device (1) as claimed in claim 1, characterized in that said first type of values (9a, 9b . . . ) of said parameter corresponds to even temperature values marked on the panel (3), in the passenger compartment (5) of the vehicle, and the second type of values (9a, 9b . . . ) of the parameter corresponds to odd temperature values.

5. A motor vehicle, the passenger compartment (5) of which is equipped with the device (1) as claimed in claim 1.

6. A method for displaying, on the instrument panel of a vehicle, a temperature indication by using a luminous pointer which moves along a row (6a, 6b) of luminous modules (7a, 7b . . . ) that can individually change between an on state and an off state with, along this row (6a, 6b), temperature values marked on the panel (3), characterized in that, depending on the temperature indication to be displayed, said pointer is made to move along the row (6a, 6b) of luminous modules (7a, 7b . . . ), with a single module (7a, 7b . . . ) on for a first type of temperature values (9a, 9b . . . ) and two adjacent luminous modules (7a, 7b . . . ) on for a second type of temperature values (9a, 9b . . . ).

7. The method as claimed in claim 6, characterized in that two successive luminous modules (7a, 7b . . . ) are switched on for a temperature value of the second type marked on the panel (3) which is intermediate between two successive values (9a, 9b . . . ) of the first type.

* * * * *